Dec. 22, 1953 E. W. ORY 2,663,360
SEAT
Filed May 3, 1951
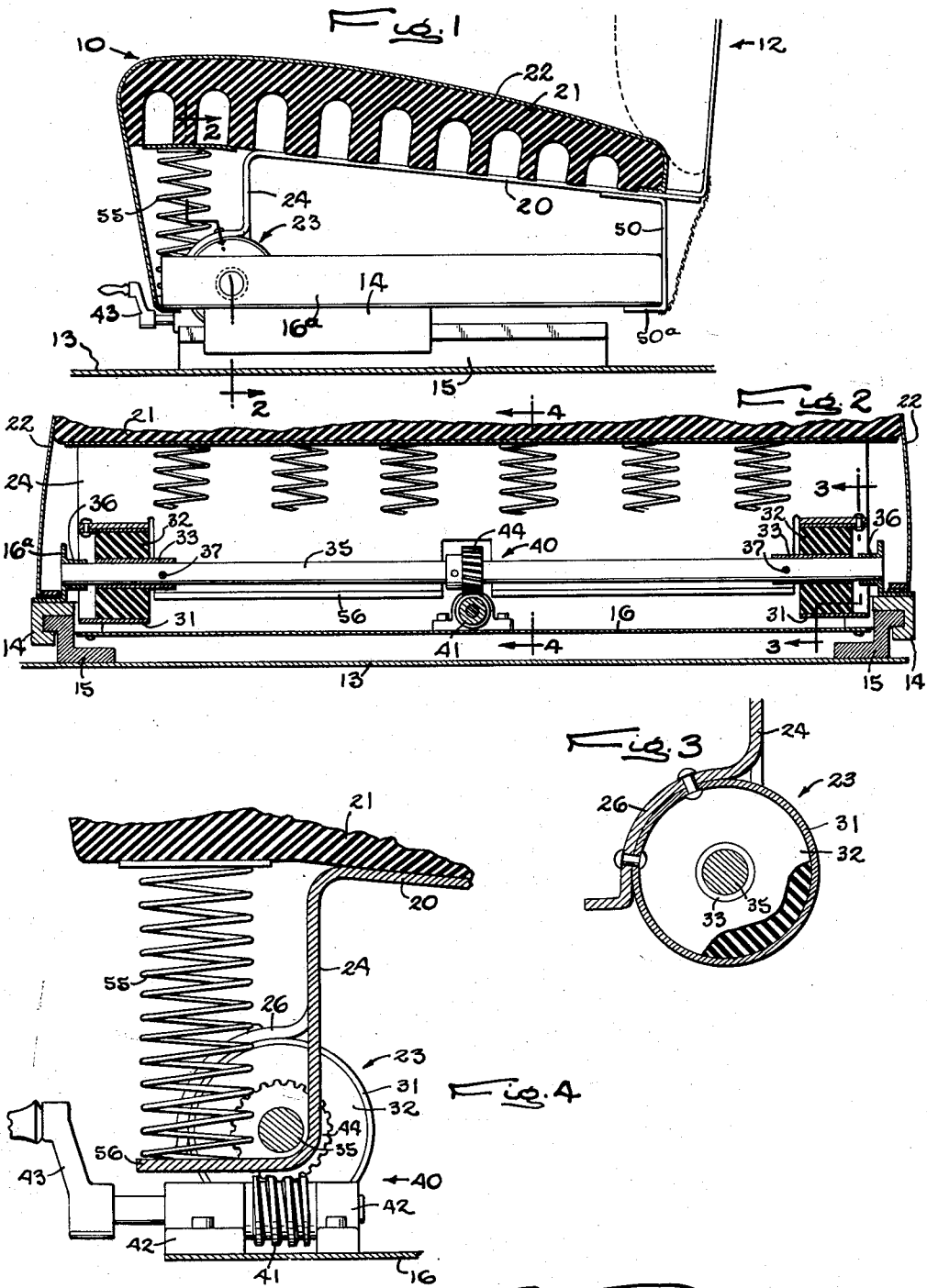
INVENTOR
Edward W. Ory
By Carlson, Pitzner, Hubbard & Wolfe
ATTORNEYS Patented Dec. 22, 1953

2,663,360

UNITED STATES PATENT OFFICE 2,663,360

SEAT

Edward W. Ory, Chicago, Ill., assignor to The Englander Company, Inc., Chicago, Ill., a corporation of Delaware Application May 3, 1951, Serial No. 224,361

1 Claim. (Cl. 155—179)

The present invention relates generally to seats of the type intended primarily for use in automotive vehicles although the features of the invention can be readily incorporated in upholstered chairs, sofas, and the like. More particularly, the invention relates to improvements in seat construction wherein resilience is afforded by a torsio-elastic device. This general type of seat construction is shown in the prior art, examples of which are described in U. S. Patent No. 2,073,872 issued March 16, 1937. Such prior constructions have not proved entirely satisfactory for a number of reasons and as a result have failed to come into common use.

It is a general object of the present invention to provide an improved seat construction which affords greater comfort than prior constructions, which is readily adaptable to persons of light and heavy physique and which overcomes the disadvantages of prior devices of the same general type, particularly when used in automobiles, motor buses and the like.

It is another object to provide a seat including a torsio-elastic device which has a greater range of utility than prior art seats and which presents a better appearance, remaining stably positioned and without any tendency toward bobbing when unoccupied.

The objects of the invention thus generally set forth, together with other objects and ancillary advantages, are attained by the construction and arrangement shown by way of illustration in the accompanying drawing, in which:

Figure 1 is a fragmentary transverse vertical section through a seat embodying the features of the invention.

Fig. 2 is a fragmentary vertical longitudinal section taken along the line 2—2 in Fig. 1.

Fig. 3 is a fragmentary transverse section taken substantially in the plane of line 3—3 in Fig. 2.

Fig. 4 is a fragmentary transverse section taken substantially in the plane of line 4—4 in Fig. 2.

While the invention is susceptible of various modifications and alternative constructions, there is shown in the drawing and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claim.

By way of illustration there is shown in the drawing a seat embodying the features of the present invention which is intended for use as the front seat of a conventional passenger automobile. The seat, generally designated 10, is equipped with an upholstered back 12 and is mounted for fore-and-aft adjustment of its position with respect to the automobile floor 13.

The seat 10 is attached to the vehicle floor 13 by means of interengaging channel and track members 14 and 15, respectively, by means of which its fore-and-aft position can be altered. The channel members 14 are made rigid with the bottom frame structure 16 of the seat 10, such structure including rigid transverse end members 16a. It will be apparent that the bottom frame structure 16, including the end members 16a, and the channels 14 and tracks 15 provide a stationary base relative to which movement of the remainder of the elements of the seat 10 occurs.

The seat 10 further includes a frame 20 which may be formed of relatively heavy gauge wire or, as shown, of flexible sheet metal. A suitable filler 21 which may be foam rubber is placed on the frame 20, the same being retained in position by a suitable covering 22. The latter may be of fabric, leather, or plastic material as desired. As shown, the covering 22 is extended over the edges of the seat and downwardly therefrom where it is attached along the edges of the bottom seat frame 16, thus providing a shroud enclosing the other seat elements.

The seat frame 20 is resiliently supported by means of torsio-elastic devices 23. To this end, rearwardly of the front edge of the seat 10 the seat frame 20 is bent downwardly to form a skirt portion 24, and adjacent each of its ends the skirt has an arcuate arm 26 struck therefrom. The latter are attached to the torsio-elastic devices 23. Each of the torsio-elastic devices 23 includes an outer cylindrical sleeve 31 within which is an annular bushing 32 of rubber or other elastic material, the same being vulcanized or otherwise surface bonded to the sleeve 31. Internally of the elastic bushing 32 is a second metallic sleeve 33 which is also surface bonded to the elastic bushing 32. As best seen in Fig. 3 of the drawing, it is to the external sleeve 31 that the seat frame arms 26 are secured.

To support the torsio-elastic device 23, a transverse rod 35 is provided which has its ends received in suitable journals 36 which are rigid with the transverse end members 16a of the stationary bottom frame 16 of the seat structure. Adjacent its ends, the rod 35 extends through the central sleeves 33 of the torsio-elastic devices 23, the same being fixed therein in any suitable manner as by pins 37.

It will be seen from the foregoing that the weight of a person placed on the seat 10 partially deforms the filler 21 and produces a slight concave bowing of the flexible seat frame 20, and is resiliently supported by the torsional yielding of the bushings 32 of the torsio-elastic devices 23.

In order to afford equal comfort to persons of different weights, provision is made for adjusting the degree of firmness afforded by the seat 10. To this end, means is provided for adjustably prestressing the torsional bushings 32 of the torsio-elastic devices 23. This is accomplished in the present instance through the provision of a worm drive, generally indicated at 40, which is operative to rotate the rod 35 and thus the central sleeves 33 of the torsio-elastic devices 23 which are fixed thereto with respect to the outer sleeves 31.

As shown, the worm drive 40 comprises a worm 41 journaled in brackets 42 which are mounted on the stationary bottom frame 16 of the seat structure. The worm 41 is equipped with a hand crank 43 and meshes with a worm gear 44 which is suitably keyed to the rod 35. The worm device may be conveniently positioned centrally of the seat 10 so as to be accessible for adjustment by an occupant of either side thereof.

If a heavy person is to occupy the seat, it is desirable to increase the torsional resistance of the device 23 which in effect will make the seat more firm. This is accomplished simply by rotating the hand crank 43 and worm 41 so as to rotate the rod 35 and sleeve 33 in a counterclockwise direction as shown in the drawing. Similarly, if the seat is to be adjusted to accommodate a person of relatively light weight, it is desirable to reduce the degree of firmness of the seat. This is accomplished by effecting less resistance to torsional yielding by rotating the hand crank 43 and worm 41 in a clockwise direction so as to similarly rotate the rod 35 and sleeve 33.

In order to stabilize the unoccupied or free position of the seat, a tie strap 50 or the like is provided to limit upward movement of the rear edge of the seat frame 20 with respect to the stationary bottom frame 16. This tie strap is welded or otherwise fastened to the frame 20 and includes an offset portion 50a which is turned under the bottom frame. If desired, more than one such strap may be used.

Use of such tie strap is accompanied by several rather important advantages. In the first place, the seat is positively positioned when not in use, regardless of the degree of the torsional adjustment. Where a plurality of such seats are used, for example, in a bus, it insures that a uniform appearance is maintained for all of the seats which are not in use. Furthermore, the seat is positively anchored against movement when it is not in use and the "bobbing" which would otherwise occur is completely eliminated.

A still further advantage of the present construction is that it permits preloading of the torsion-adjusting mechanism. Upon reference to Figure 1 it will be noted that the adjusting crank may be rotated to bias the seat strongly in the upward direction without any accompanying bodily movement of the seat itself. When the seat is rather substantially preloaded, it may be occupied by a heavy person with only a limited amount of downward movement of the seat relative to the frame and without any danger of the seat "bottoming" on the frame.

It will be apparent that upon increasing the torsional resistance of the devices 23, the seat frame 20 tends to be rotated in a counterclockwise direction. Any such movement in the unoccupied seat is resisted by the straps 50. Nevertheless, such tendency to move in a counterclockwise direction will be manifested in a slight upward bowing of the horizontal seat frame 20 which will effect further increased firmness of the seat to accommodate extremely heavy loads. It will also be apparent from an inspection of Fig. 1 of the drawing that even if the seat be so severely loaded that the rear edge of the frame 20 is swung downwardly until it engages the stationary bottom frame 16, the resilient character of the frame 20 still affords some flexibility in addition to the cushioning afforded by the filler 21.

It will be apparent that if a person were to move forwardly on the seat his weight would be disposed almost directly over the torsio-elastic devices 23. Thus the lever arm action of the frame 20 would be reduced to a point where substantially no rotation of the sleeve 31 could be effected. Another important aspect of the present construction, therefore, lies in the provision of means for softening the front edge of the seat 10. To this end a row of vertically disposed coil springs 55 is provided along the front of the seat beneath the front portion of the filler 21. To support the springs 55, the lower edge portion of the seat frame skirt 24 is bent forwardly to provide a ledge 56 disposed directly beneath the front edge of the seat, and the springs 55 are attached thereto.

I claim as my invention:

A seat comprising, in combination, a fixed frame, a torsio-elastic device supported on said fixed frame adjacent the front edge thereof, a seat frame having a depending skirt portion along its front edge fixed to said device to support said seat frame in spaced relation above said fixed frame, the free edge of said skirt portion projecting outwardly to define a ledge, a resilient filler supported on top of said seat frame and having a portion projecting beyond the front edge thereof, and a row of vertically disposed coil springs fixed to said ledge and supporting the projecting portion of said filler to provide the seat with a soft front edge.

EDWARD W. ORY.

References Cited in the file of this patent

UNITED STATES PATENTS

| Number | Name | Date |
|---|---|---|
| 1,441,534 | McCullough | Jan. 9, 1923 |
| 2,008,209 | Herold | July 16, 1935 |
| 2,049,550 | Van Dresser et al. | Aug. 4, 1936 |
| 2,073,872 | Kliesrath | Mar. 16, 1937 |
| 2,087,254 | Herold | July 20, 1937 |
| 2,202,113 | Miller | May 28, 1940 |
| 2,365,200 | Lorenz | Dec. 19, 1944 |
| 2,409,826 | Bernstein | Oct. 22, 1946 |

FOREIGN PATENTS

| Number | Country | Date |
|---|---|---|
| 994,240 | France | Aug. 3, 1951 |